United States Patent
Kim et al.

(10) Patent No.: US 10,492,161 B2
(45) Date of Patent: Nov. 26, 2019

(54) METHOD AND DEVICE FOR ACQUIRING UPLINK SYNCHRONISM IN CONSIDERATION OF BEAM FORMING EFFECT IN WIRELESS COMMUNICATION SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 15/571,450

(22) PCT Filed: May 9, 2016

(86) PCT No.: PCT/KR2016/004791
§ 371 (c)(1),
(2) Date: Nov. 2, 2017

(87) PCT Pub. No.: WO2016/178546
PCT Pub. Date: Nov. 10, 2016

(65) Prior Publication Data
US 2019/0159154 A1    May 23, 2019

Related U.S. Application Data

(60) Provisional application No. 62/157,478, filed on May 6, 2015.

(51) Int. Cl.
H04W 56/00    (2009.01)
H04W 72/04    (2009.01)
(Continued)

(52) U.S. Cl.
CPC ...... *H04W 56/0045* (2013.01); *H04B 7/0456* (2013.01); *H04B 7/06* (2013.01);
(Continued)

(58) Field of Classification Search
CPC ................................ H04W 56/0045
See application file for complete search history.

(56) References Cited

U.S. PATENT DOCUMENTS

2008/0167075 A1*  7/2008  Kurtz ............... H04L 5/0053
                                                          455/561
2011/0250913 A1* 10/2011  Vajapeyam ...... H04W 74/0833
                                                          455/507
(Continued)

FOREIGN PATENT DOCUMENTS

KR  10-2014-0002558 A   1/2014
WO  WO 2013/095003 A1   6/2013
(Continued)

*Primary Examiner* — Rasheed Gidado
(74) *Attorney, Agent, or Firm* — Birch, Stewart, Kolasch & Birch, LLP

(57) ABSTRACT

Provided is a method for estimating a timing advance (TA) for each beam in a wireless communication system. First, a terminal transmits K preambles, to which K mutually different beam formings are applied, to a base station. The base station estimates the TA for each of the K received preambles. The base station can determine the final TA value of the terminal on the basis of the TAs estimated for each of the K preambles.

17 Claims, 17 Drawing Sheets

(51) Int. Cl.
*H04B 7/06* (2006.01)
*H04B 7/0456* (2017.01)
*H04L 5/00* (2006.01)

(52) U.S. Cl.
CPC ........ *H04B 7/0617* (2013.01); *H04W 56/001* (2013.01); *H04W 72/04* (2013.01); *H04W 72/046* (2013.01); *H04L 5/0007* (2013.01)

(56) References Cited

U.S. PATENT DOCUMENTS

| | | | |
|---|---|---|---|
| 2013/0301619 A1* | 11/2013 | Singh | H04W 56/004 370/336 |
| 2014/0003369 A1* | 1/2014 | Josiam | H04W 72/0406 370/329 |
| 2014/0044108 A1 | 2/2014 | Earnshaw et al. | |
| 2014/0177607 A1* | 6/2014 | Li | H04B 7/0617 370/336 |
| 2016/0099763 A1* | 4/2016 | Chen | H04B 7/063 370/329 |

FOREIGN PATENT DOCUMENTS

| WO | WO 2014/109569 A1 | 7/2014 |
|---|---|---|
| WO | WO 2015/030524 A1 | 3/2015 |

\* cited by examiner

METHOD AND DEVICE FOR ACQUIRING UPLINK SYNCHRONISM IN CONSIDERATION OF BEAM FORMING EFFECT IN WIRELESS COMMUNICATION SYSTEM

CROSS REFERENCE TO RELATED APPLICATIONS

This application is a National Phase of PCT International Application No. PCT/KR2016/004791, filed on May 9, 2016, which claims priority under 35U.S.C. 119(e) to U.S. Provisional Application No. 62/157,478, filed on May 6, 2015, all of which are hereby expressly incorporated by reference into the present application.

BACKGROUND OF THE INVENTION

Field of the Invention

The present invention relates to wireless communication, and more particularly, to a method and a device for acquiring uplink synchronization in consideration of the effect of beamforming in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As a way to improve the efficiency of limited resources, so-called multi-antenna technology is being actively developed which achieves diversity gain by putting multiple antennas on the transmitter and receiver to cover more spatial regions for resource utilization, and which increases transmission capacity by transmitting data in parallel through each antenna. Multi-antenna technology may employ beamforming and/or precoding to improve signal-to-noise ratio (SNR). In closed-loop systems that can use feedback information at the transmitting end, beamforming and/or precoding may be used to maximize SNR through such feedback information. Beamforming is broadly classified into analog beamforming and digital beamforming.

Massive multiple-input multiple-output (MIMO) is a multi-antenna technology in which tens of antennas or even more, which is a lot more than now, are put into a base station to achieve higher data rates and higher energy efficiency. When conventional analog beamforming and/or digital beamforming is directly used in massive MIMO, signal processing and/or hardware implementation can get very complex, or the performance increase through the use of multiple antennas is only slight and the flexibility of resource allocation may be reduced. Consequently, the use of hybrid beamforming, a combination of conventional analog and digital beamforming, in massive MIMO is under discussion.

Recently, due to the rapid spread of mobile smart devices and the emergence of big data, mobile traffic is expected to be doubled every year and increased more than 1000 times in 10 years. The burden of mobile network operators have been increased due to the explosion of mobile traffic, and existing 4G mobile communication systems with limited additional frequency coverage cannot accommodate the explosive mobile traffic. Therefore, the development of 5th generation mobile communication technology based on millimeter wave (mmWave) capable of securing broadband is being discussed. The millimeter wave is a frequency band of 30-300 GHz which is generally called extremely high frequency (EHF) band and has its wavelength of 1 cm to 1 mm. The wave with the wavelength is in the middle of the currently used radio frequency band and the infrared ray (its wavelength about 0.1 mm), and it is very close to the light and is used in high resolution radar and microwave spectroscopy. The millimeter wave has less diffraction properties and larger directive properties than the conventional communication wave, and has larger diffraction properties, and less directive properties than the laser beam. When millimeter waves are used for communication, it is considered that ultra-multiple communications is possible in that far exceeds the microwave communication capacity, but there is large transmission loss in the spatial transmission. This is because the energy absorption by the oxygen and water molecules in the atmosphere is relatively large compared to the existing cellular frequency, resulting in high path loss.

When hybrid beamforming is introduced, individual beams may have different channel characteristics and thus may have different channel delays. Therefore, a method for acquiring uplink synchronization different from a conventional method may be required in consideration of such characteristics.

SUMMARY OF THE INVENTION

The present invention provides a method and a device for acquiring uplink synchronization in consideration of the effect of beamforming in a wireless communication system. The present invention provides a method and a device for solving timing misalignment per beam, which occurs due to change of channel characteristic per beam when uplink beam scanning is performed. The present invention also provides a method and a device for estimating a channel delay per beam, and finally determining a timing advance value In an aspect, a method for estimating, by a base station (BS), a timing advance (TA) for each beam in a wireless communication system is provided. The method includes receiving K preambles, to which K different beamformings are applied, from a user equipment (UE), and estimating a TA for each of the K preambles.

In another aspect, a method for applying, by a user equipment (UE), a timing advance (TA) in a wireless communication system is provided. The method includes transmitting K preambles, to which K different beamformings are applied, to a base station (BS), and receiving a TA command comprising a final TA value, which is determined by the BS based on the K preambles, from the BS.

It is possible to prevent timing misalignment between beams caused by a change in channel characteristics for each beam.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
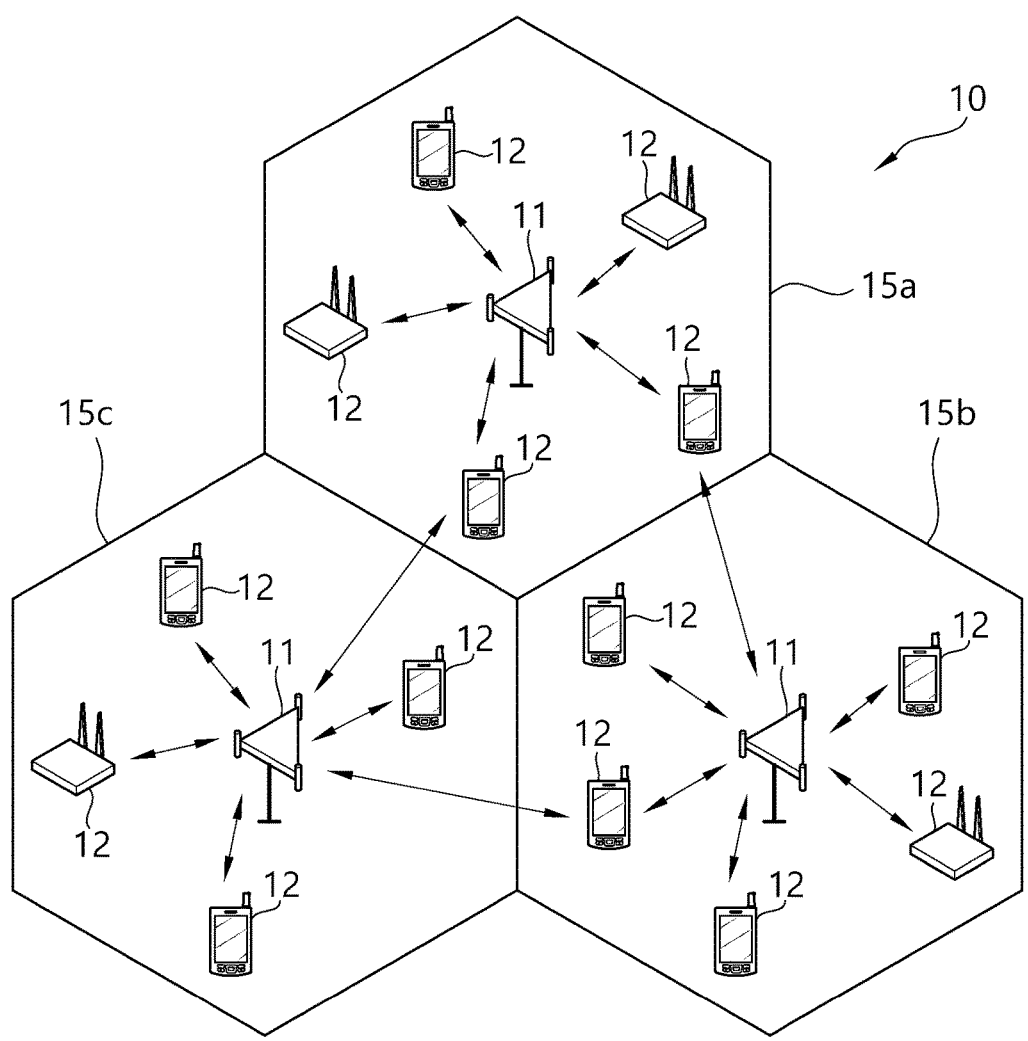
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The cellular system includes a different cell adjacent to the serving cell. The different cell adjacent to the serving cell is called a neighbor cell. A BS providing a communication service to the neighbor cell is called a neighbor BS. The serving cell and the neighbor cell are relatively determined based on a UE.

This technique can be used for downlink (DL) or uplink (UL). In general, DL refers to communication from the BS 11 to the UE 12, and UL refers to communication from the UE 12 to the BS 11. In DL, a transmitter may be part of the BS 11 and a receiver may be part of the UE 12. In UL, a transmitter may be part of the UE 12 and a receiver may be part of the BS 11.

Figure 2:
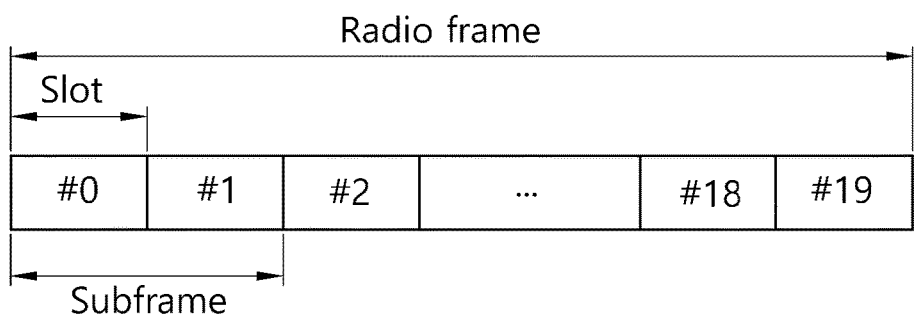
FIG. 2 shows a structure of a radio frame of 3GPP LTE.

FIG. 2 shows a structure of a radio frame of 3GPP LTE. Referring to FIG. 2, a radio frame consists of 10 subframes, and a subframe consists of two slots. Slots within the radio frame are numbered from #0 to #19. A transmission time interval (TTI) is a basic scheduling unit for data transmission. In 3GPP LTE, one TTI may be equal to the time it takes for one subframe to be transmitted. One radio frame may have a length of 10 ms, one subframe may have a length of 1 ms, and one slot may have a length of 0.5 ms.

One slot includes a plurality of orthogonal frequency division multiplexing (OFDM) symbols in time domain and a plurality of subcarriers in frequency domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners. 3GPP LTE defines one slot as 7 OFDM symbols in a normal cyclic prefix (CP) and one slot as 6 OFDM symbols in an extended CP.

The need for hybrid beamforming will be described. Beamforming technology using multiple antennas may be broadly divided into analog beamforming technology (hereinafter, "analog beamforming") and digital beamforming technology (hereinafter, "digital beamforming") depending on where a beamforming weight vector (or precoding vector) is applied.

Figure 3:
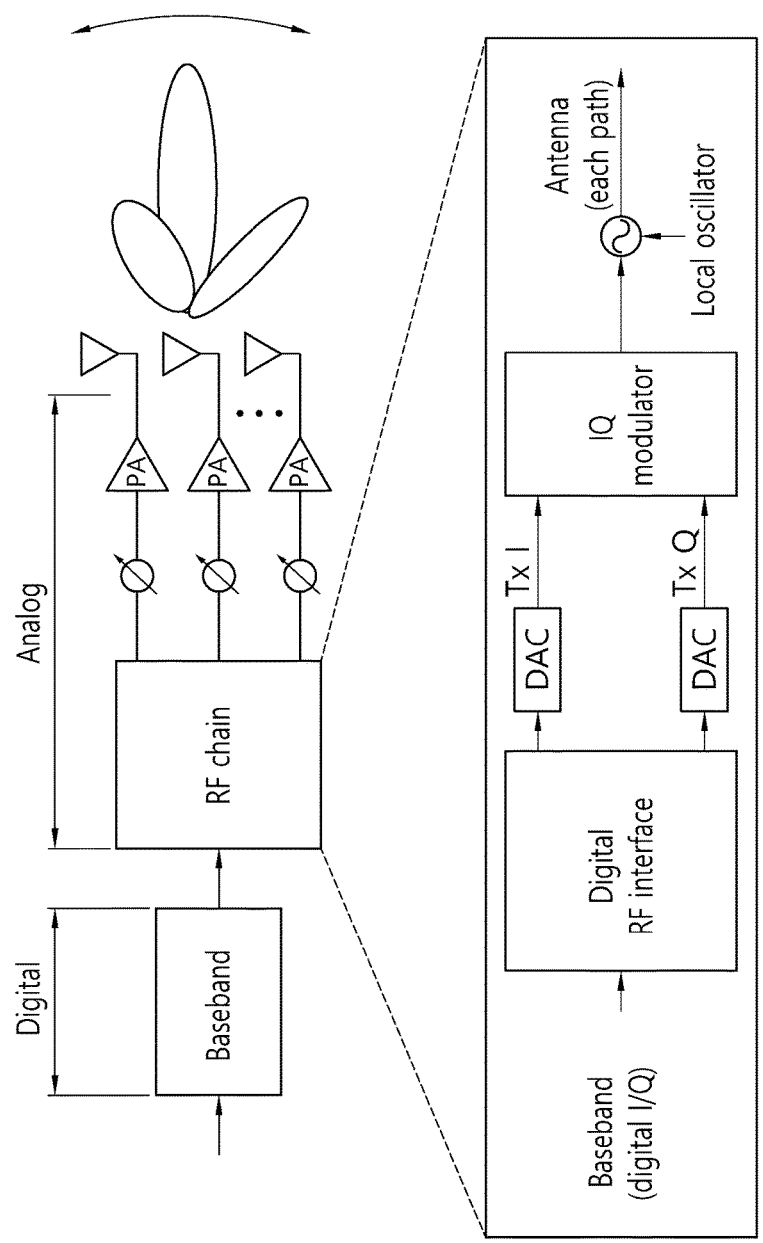
FIG. 3 is a block diagram of a transmitter including an analog beamformer and a radio frequency (RF) chain.

FIG. 3 is a block diagram of a transmitter including an analog beamformer and a radio frequency (RF) chain. Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 3, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 4:
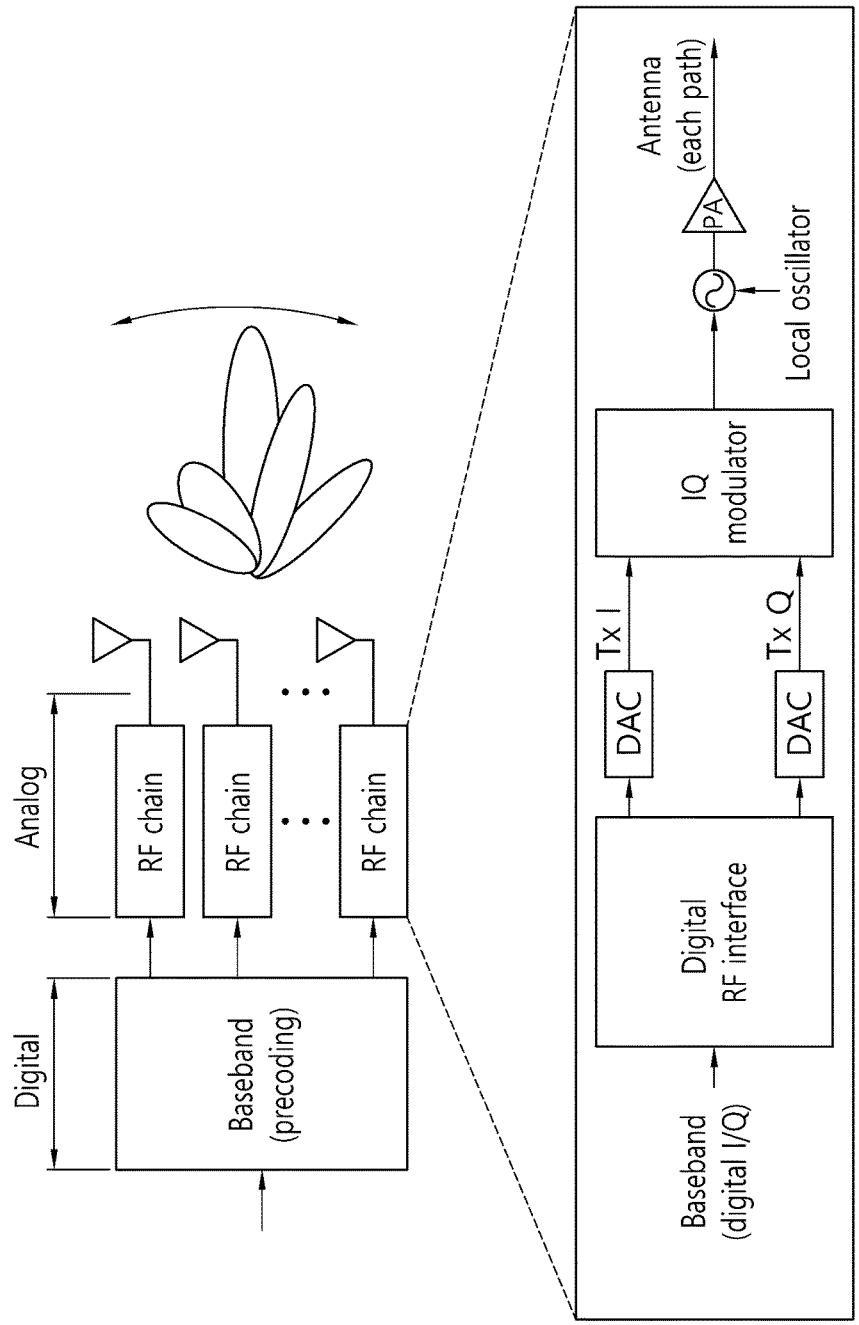
FIG. 4 is a block diagram of a transmitter including a digital beamformer and a RF chain.

FIG. 4 is a block diagram of a transmitter including a digital beamformer and a RF chain. In digital beamforming, as opposed to analog beamforming, a beam is formed in the digital stage by a baseband process, in order to maximize diversity and multiplexing gain in an MIMO environment. Referring to FIG. 4, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Hybrid beamforming will be described. As described above, the purpose of hybrid beamforming is to configure a transmitting end that provides the benefits of analog beamforming and the benefits of digital beamforming in a massive MIMO environment.

Figure 5:
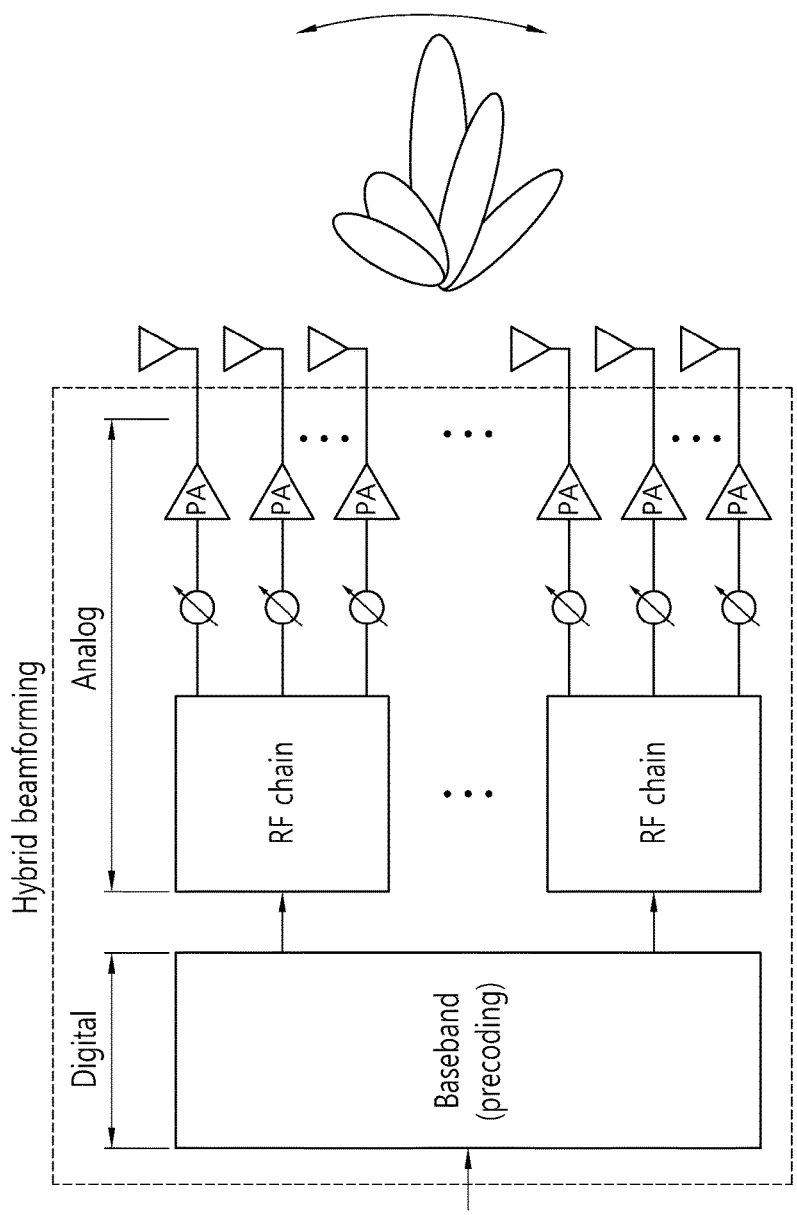
FIG. 5 is a block diagram of a transmitter including a hybrid beamformer.

FIG. 5 is a block diagram of a transmitter including a hybrid beamformer. Referring to FIG. 5, hybrid beamforming may basically allow for forming a coarse beam through analog beamforming and then a beam for multi-stream or multi-user transmission through digital beamforming. That is, hybrid beamforming exploits both analog beamforming and digital beamforming in order to lower the complexity of implementation at the transmitting end or hardware complexity.

Technical issues with hybrid beamforming are as follows.

(1) Difficulties in optimizing analog/digital beamforming designs: While digital beamforming allows for forming individual beams for different users using the same time-frequency resource, analog beamforming is limited in that a common beam has to be formed using the same time-frequency resource. This limitation may cause issues like a limit on the largest possible number of ranks corresponding to the number of RF chains, the difficulty of subband beam control using an RF beamformer, and/or the difficulty of optimization of beamforming resolution/granularity.

(2) Need for a specific method of common signal transmission: In analog beamforming, which forms a beam only in a particular direction on the same time-frequency resource, it is not possible to form multiple beams simultaneously in the directions of all UEs. Thus, DL/UL control channels, reference signals, broadcast channels, synchronization signals, etc., may not be transmitted simultaneously to all UEs that may be distributed over all areas in a cell. There are also problems which occur when a UE transmits physical random access channel (PRACH), physical uplink control channel (PUCCH), and/or sounding RS (SRS) over UL.

(3) Need for the design of more pilots and feedback to determine an analog/digital beam: In the case of estimation for analog/digital beams, the digital beam may be estimated directly by using a conventional orthogonal pilot allocation scheme, whereas the analog beam requires as long a time-duration as the number of beam candidates. This means that the more time delay is needed for analog beam estimation, and this may cause a system loss. Moreover, simultaneously estimating both digital and analog beams may lead to a considerable increase in complexity.

(4) Difficulties in supporting analog beam-based spatial division multiple access (SDMA) and FDMA: Digital beamforming allows to freely form beams for multi-users/streams, whereas, in analog beamforming, the same beam is formed for the entire transmission band, making it difficult to form an independent beam per user or per stream. In particular, it is hard to support FDMA (e.g. OFDMA) through orthogonal frequency resource allocation, thus making the optimization of frequency resource efficiency impractical.

Among the technical issues of the hybrid beamforming described above, the present invention described below can provide a method for optimizing the analog/digital beam design for the hybrid beamforming.

Timing advance (TA) will be described. In order to maintain UL orthogonality between receptions from different UEs in 3GPP LTE, the timings of UL received from the different UEs are aligned in a receiver of a BS. That is, UL transmission and DL transmission may be aligned on the time axis at the BS. Timing alignment in UL transmissions is one basic method for avoiding interference UEs in a cell. TA may be applied to the UL transmission of a UE in order to achieve timing alignment in UL transmission. A UE may set a TA value corresponding to reception DL timing, thus dealing with different propagation delays of different UEs.

Figure 6:
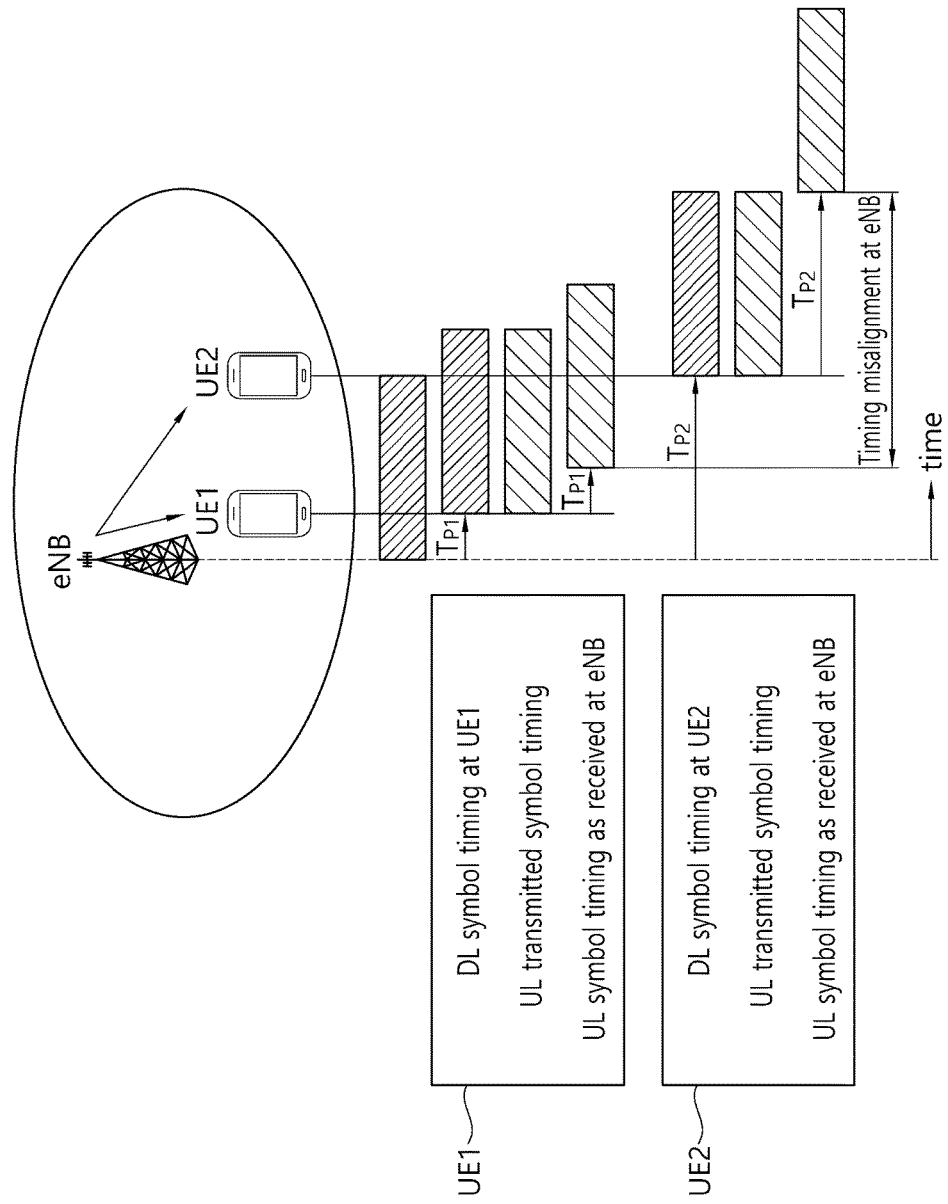
FIG. 6 shows an example of timing alignment in UL transmission to which no TA is applied.

FIG. 6 shows an example of timing alignment in UL transmission to which no TA is applied. Referring to FIG. 6, UE1 is located relatively close to a BS and thus has a relatively short propagation delay TP1, while UE2 is far from the BS and thus has a relatively long propagation delay TP2 (that is, TP1<TP2). A criterion for the propagation delays is timing for a DL symbol that a UE receives. Assuming that DL symbol timing in the BS is T, timing for a DL symbol received by UE1 is T+TP1 as a result of a delay of the propagation delay TP1 of UE1. Assuming that UE1 performs UL transmission without delay, UL symbol timing in UE1 is T+TP1 and timing for a UL symbol received by the BS is T+2*TP1 as a result of an additional delay of the propagation delay TP1. Likewise, timing for a DL symbol received by UE2 is T+TP2 as a result of a delay of the propagation delay TP2 of UE2. Assuming that UE2 performs UL transmission without delay, UL symbol timing in UE2 is T+TP2 and timing for a UL symbol received by the BS is T+2*TP2 as a result of an additional delay of the propagation delay TP2. That is, for the BS, a misalignment of 2*(TP2−TP1) occurs between the timing of UL transmission performed by UE1 and the timing of UL transmission performed by UE2.

Figure 7:
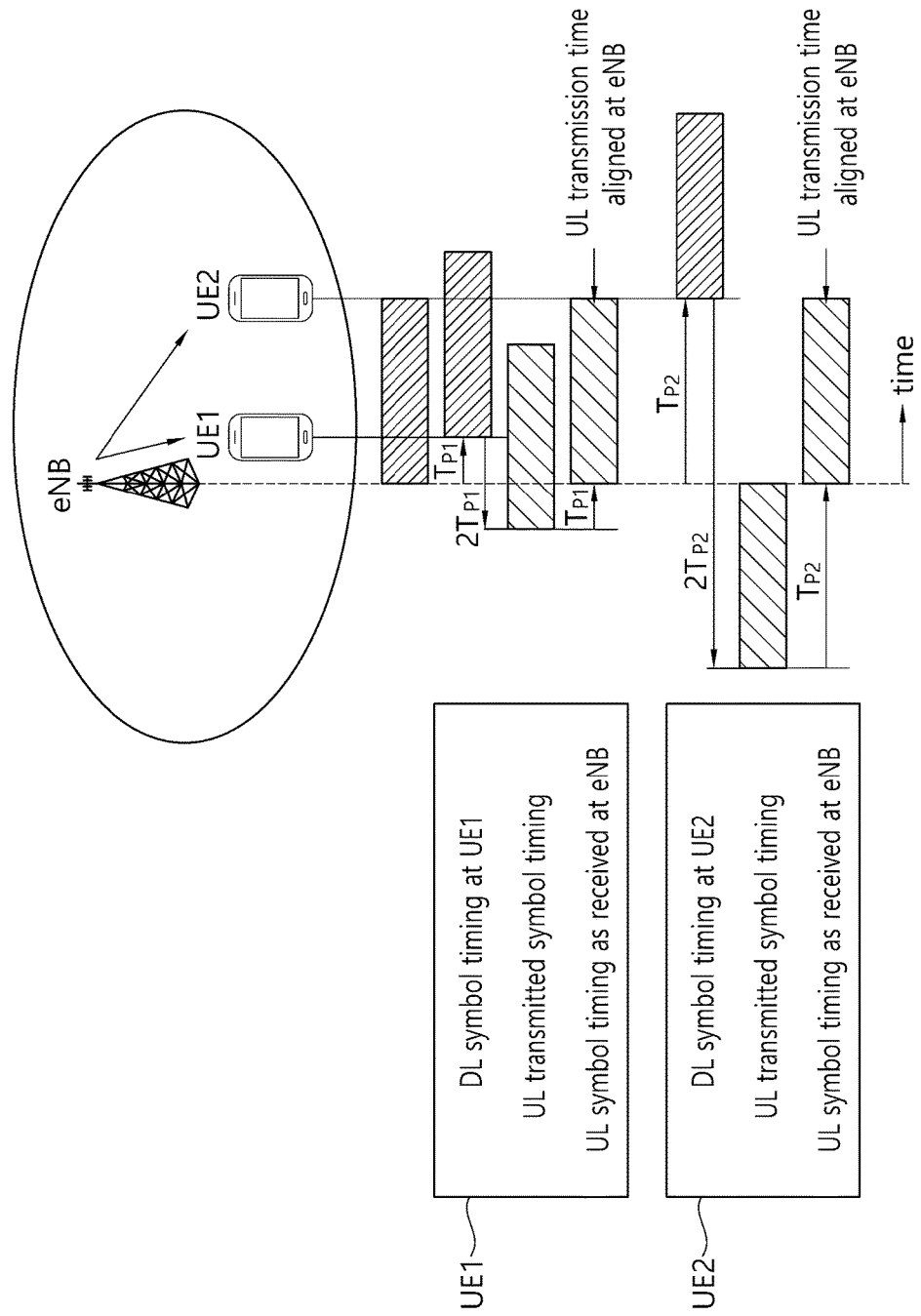
FIG. 7 shows an example of timing alignment in UL transmission to which TA is applied.

FIG. 7 shows an example of timing alignment in UL transmission to which TA is applied. By applying TA, it is possible to appropriately achieve timing alignment in a BS. For the application of TA, a measured propagation delay is converted into a round trip delay (RTD), and thus a value of (propagation delay*2) is applied. Referring to FIG. 7, assuming that the DL symbol timing in the BS is T, timing for a DL symbol received by UE1 is T+TP1 as a result of a delay of the propagation delay TP1 of UE1. UE1 applies a TA value of TP1*2, and UL transmission timing in UE1 is T−TP1. Accordingly, timing for a UL symbol received by the BS is T, and DL transmission and UL reception are aligned in the BS. Likewise, timing for a DL symbol received by UE2 is T+TP2 as a result of a delay of the propagation delay TP2 of UE2. UE2 applies a TA value of TP2*2, and UL transmission timing in UE2 is T−TP2. Accordingly, timing for a UL symbol received by the BS is T, and DL transmission and UL reception are aligned in the BS. It is shown that a UE that is farther from the BS and thus has a greater propagation delay needs to perform UL transmission relatively first for timing alignment in the BS.

For the initial TA procedure, a UE performs initial receiver synchronization for DL transmission from a BS and performs TA using a random access procedure. The BS measures UL timing through a random access preamble transmitted from the UE and transmits an initial TA command corresponding to the UL timing through a random access response (RAR). The TA command may have a size of 11 bits.

TA may be updated depending on the situation. The BA may perform a TA update command using all available UL reference signals (RSs). That is, the BS may perform the TA update command using an SRS, a channel quality indicator (CQI), an acknowledgment/non-acknowledgment (ACK/NACK), or the like. Generally, a SRS may be advantageous because the accuracy of timing estimation increases with the use of a UL RS transmitted over a wide bandwidth. However, for a UE located on the cell boundary, there may be a restriction on using an SRS due to power limitation. However, since TA update depends on the implementation of the BS, no limitation is described in the standard.

Figure 8:
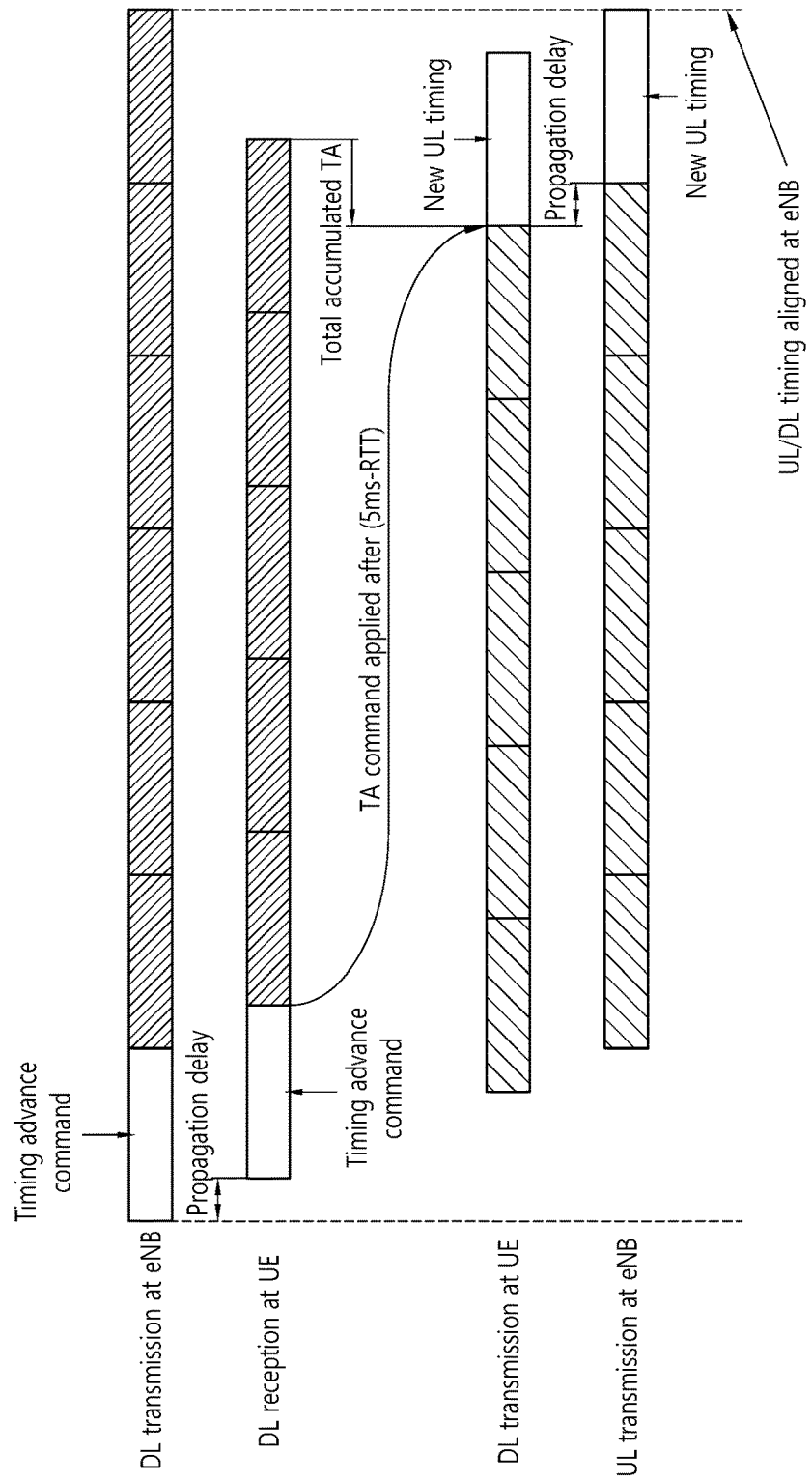
FIG. 8 shows an example of applying a TA command for TA update.

FIG. 8 shows an example of applying a TA command for TA update. Referring to FIG. 8, the TA command for TA update is applied when a UE transmits the first UL subframe after receiving the TA command (5 ms-round trip time (RRT)), because a time division duplex (TDD) frame or a half-duplex frequency division duplex (FDD) frame may have no UL subframe at the time depending on the UL/DL configuration. RTT may be propagation delay*2.

It has been assumed that a UE uses an omni-directional antenna having a single channel characteristic in 3GPP LTE and thus UL timing alignment is performed only with respect to a single channel characteristic. However, when a UE performs narrowband beamforming using a large number of antennas with the introduction of hybrid beamforming, individual beams may have different scattering environments and a timing misalignment rate may vary by each beam. Such characteristics become more significant in a millimeter wave (mmWave) band. In the millimeter wave band, the distribution of scatters is changed by beamforming and path attenuation according to the distance further increases. In the millimeter wave band, since a hybrid beamforming structure is supported in consideration of the ease of implementation and the complexity of a baseband, the aforementioned beam scanning procedure may be absolutely needed. In addition, such characteristics may become more significant when the symbol periods of data and UL RACH are the same.

Figure 9:
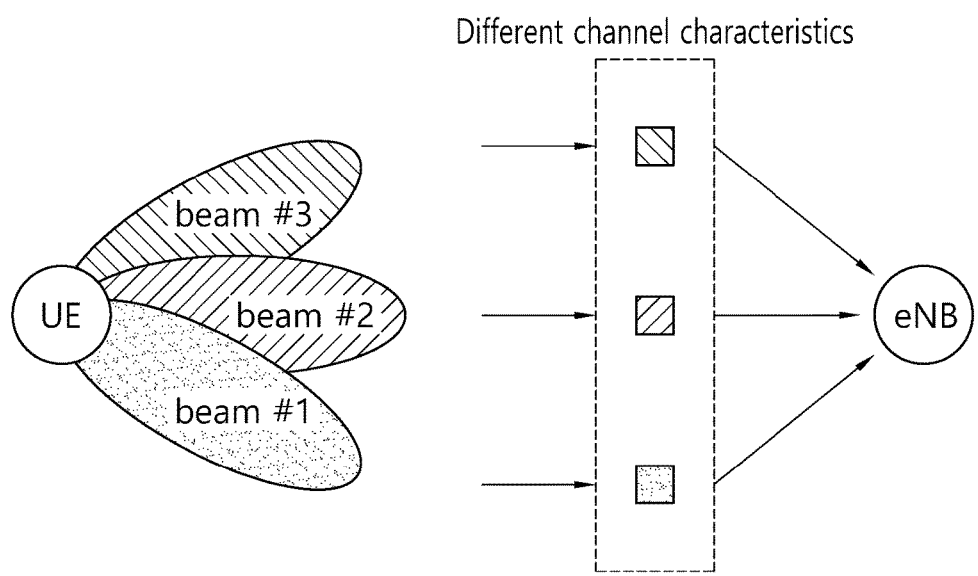
FIG. 9 is a conceptual view showing that a channel characteristic changes by beam.

FIG. 9 is a conceptual view showing that a channel characteristic changes by beam. As described above, in hybrid beamforming, beam scanning needs to be performed in the time domain. However, as a direction by beamforming is directed toward a specific scatter, multipath characteristics may change and thus channel characteristics may change. Referring to FIG. 9, a UE performs UL transmission through beams #1, #2 and #3, and multipath characteristics change by beam according to the beamforming direction. Therefore, a BS experiences different channel characteristics for each beam when performing beam scanning.

Figure 10:
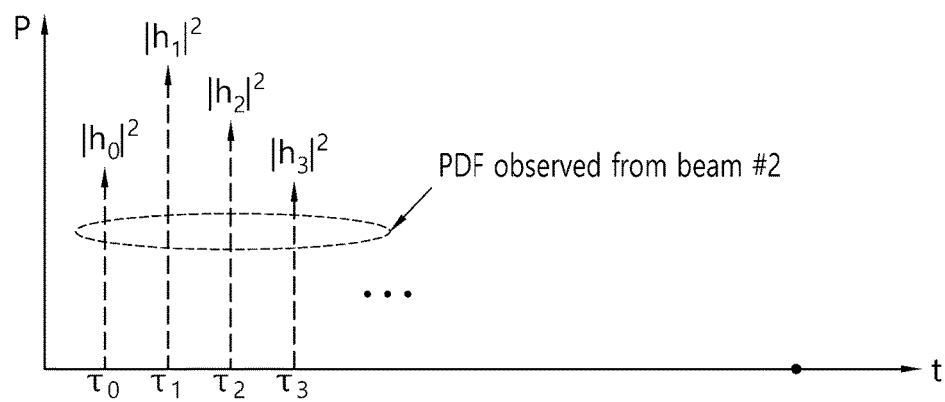
FIG. 10 is a conceptual diagram showing that each beam has a different channel characteristic.
Figure 10:
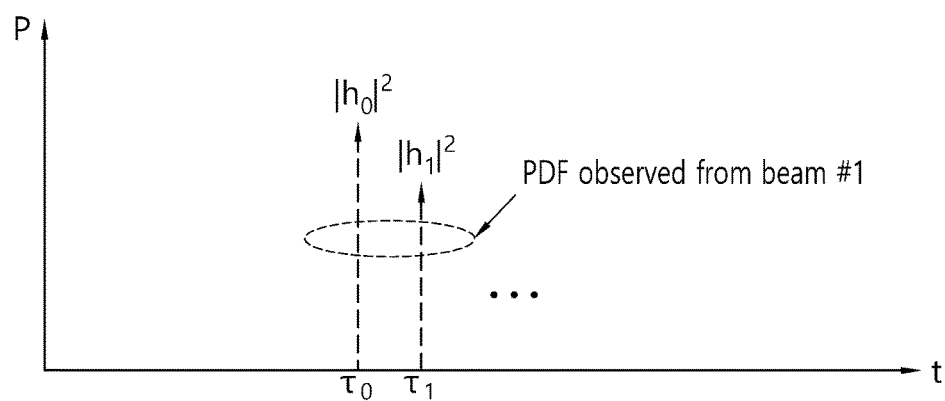

FIG. 10 is a conceptual diagram showing that each beam has a different channel characteristic. Referring to FIG. 10, channel characteristics of beam #1 and beam# 2 have different forms. In particular, each beam has different TA timing ($\tau_0$) corresponding to a propagation delay.

In order to solve the foregoing problem, that is, the problem that as channel characteristics change by beam with the introduction of hybrid beamforming in the millimeter wave band, timing misalignment also changes by beam, the present invention proposes a TA procedure considering beam scanning characteristics. That is, the present invention proposes a TA procedure for each beam considering a change in channel characteristics by beam. According to an embodiment of the present invention, a TA value for each beam may be estimated considering the characteristics of an analog beam scanning procedure for performing hybrid beamforming. That is, in addition to an existing TA procedure based on an omni-directional antenna, a TA procedure optimized for each beam based on beamforming may be proposed for data transmission. In the following description, beamforming is assumed to be analog beamforming or hybrid beamforming, but the present invention is not necessarily limited thereto. The present invention may also be applied to general digital beamforming, full-dimension MIMO (FD-MIMO), and the like.

First, according to an embodiment of the present invention, a BS estimates a TA value for each of K different preambles, to which K different beamformings are applied, on the time axis, or each UL RS transmitted from one UE in UL beam scanning. That is, the BS estimates a TA value, which changes by a change in channel characteristics by beamforming, for each beam in UL beam scanning. A different TA value is estimated for each beam, because a beam scanning process is necessarily involved in view of the characteristics of an analog terminal. The BS may estimate a UL channel delay and a TA value for each beam through a basic agreement about beam scanning with a UE.

Figure 11:
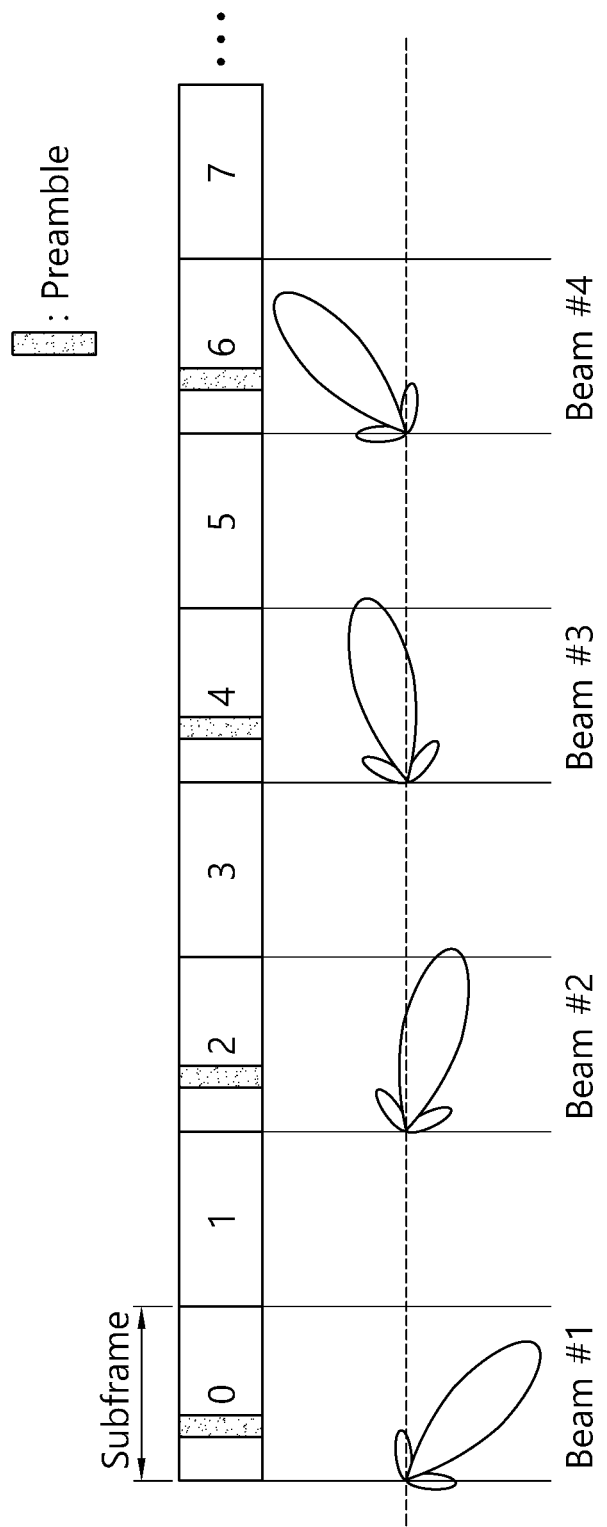
FIG. 11 shows an example of a preamble transmitted by a UE for UL beam scanning of a BS according to an embodiment of the present invention.

FIG. 11 shows an example of a preamble transmitted by a UE for UL beam scanning of a BS according to an embodiment of the present invention. Referring to FIG. 11, for UL beam scanning of the BS, the UE transmits four different preambles, to which different beamformings are applied, to the BS. The four preambles are transmitted via different subframes on the time axis. Further, it is assumed that a corresponding beamforming direction is set in each preamble.

Figure 12:
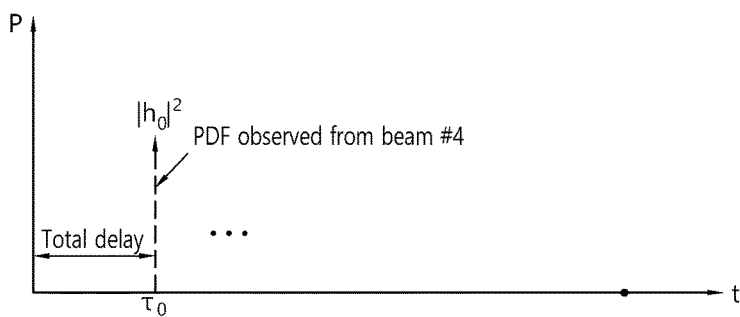
FIG. 12 shows an example of different channel characteristics and different total delays for respective beams according to an embodiment of the present invention.
Figure 12:
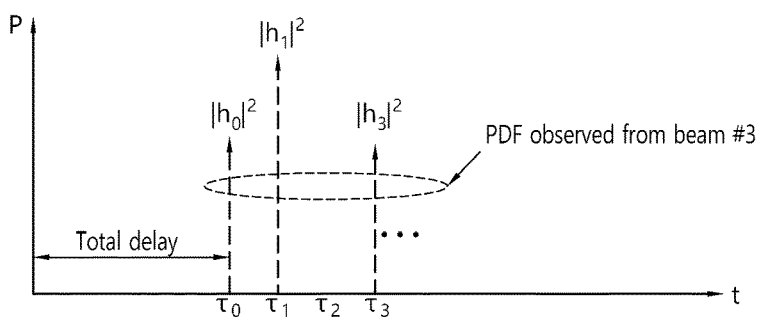
Figure 12:
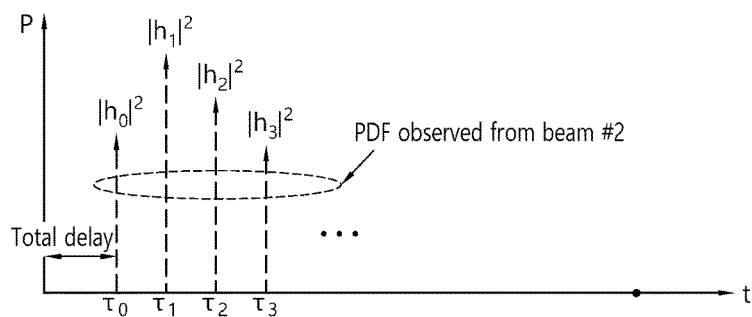
Figure 12:
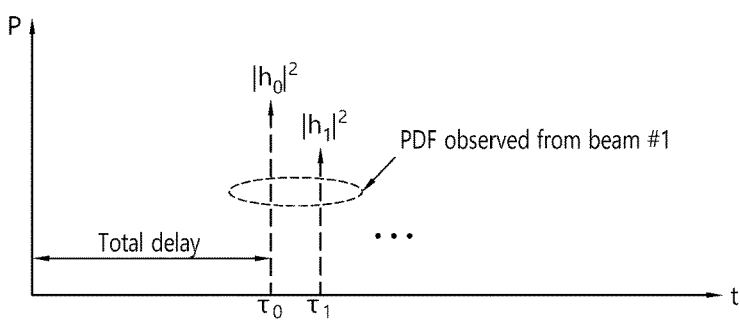

FIG. 12 shows an example of different channel characteristics and different total delays for respective beams according to an embodiment of the present invention. According to the embodiment of FIG. 11, when four different preambles are transmitted via different beamformings, a delay profile may be different by beam due to a different channel characteristic by beam. FIG. 12 shows that beams have different channel characteristics are different and thus have different delay profiles.

Table 1 shows a total delay and a TA value corresponding to each of K beam indices.

TABLE 1

| Beam index | Total delay | TA |
|---|---|---|
| 1 | $\tau_{beam,1}$ | $2*\tau_{beam,1}$ |
| 2 | $\tau_{beam,2}$ | $2*\tau_{beam,2}$ |
| 3 | $\tau_{beam,3}$ | $2*\tau_{beam,3}$ |
| ... | ... | ... |
| K | $\tau_{beam,K}$ | $2*\tau_{beam,K}$ |

The BS estimates a channel delay and a TA value for each beam based on K different preambles or UL RSs transmitted from the UE. Assuming that the preambles or the UL RSs are detected in the time domain, a channel delay $m_K^*$ that maximizes output at a beam K may be obtained by Equation 1.

$$m_K^* = \arg\min_m \left| \sum_{j=0}^{L-1} \sum_{i=0}^{N-1} Y[i+j+m]S^*[i] \right|^2 \quad \text{[Equation 1]}$$

In Equation 1, i is a time index, m is a timing offset, N is the total length of a time signal (or OFDM symbol length), L is multipath channel delay length by probability distribution function (PDF), Y[i] is a signal received at time i, and S[i] is a signal transmitted at time i. A channel delay and a TA value for each of K different beams may be estimated through Equation 1, and accordingly the BS may perform a TA command according to a beam suitable for the UE.

According to an embodiment of the present invention, the BS may perform a TA command to the UE based on a channel delay or a TA value estimated for each beam. In detail, the BS may perform a TA command in view of the channel delay or the TA value of at least one of the K different beams detected by beam scanning. The BS may determine the final TA value of the UE based on various criteria. The BS may determine the final TA value of the UE based on one beam. For example, the BS may determine the final TA value of the UE based on the TA value of a beam having the best reception quality among the detected beams. Alternatively, the BS may determine the final TA value of the UE based on a plurality of beams. For example, the BS may determine the final TA value of the UE based on the TA values of a plurality of beams having a signal strength or signal quality of a threshold or higher among the detected beams. Hereinafter, various embodiments in which the BS determines or selects the final TA value of the UE will be described.

(1) Determine a final TA value corresponding to a selected beam: The BS may select a beam having the best reception quality among detected beams and may determine a TA value corresponding to the selected beam as a final TA value. That is, the final TA value may be determined by Equation 2.

$$\text{Total TA} = 2 \times \tau_{beam,K} \quad \text{[Equation 2]}$$

For example, when beam #2 has the best reception quality among K beams, a final TA value may be determined to be $2*\tau_{beam,2}$.

(2) Determine the average value of a TA value for conventional synchronization and a TA value for a selected beam as a final TA value: The BS may determine, as a final TA value, the average value of a TA value $2*\tau_{TA}$ used for conventional UL synchronization and a TA value $2*\tau_{beam,best}$ for a beam having the best reception quality among detected beams. That is, the final TA value may be determined by Equation 3.

$$\text{Total } TA = \frac{2 \times \tau_{beam,K} + 2 \times \tau_{TA}}{2} \quad \text{[Equation 3]}$$

(3) Determine the average value of a TA value for a beam having the best reception quality and a TA value for a beam having the second best reception quality as a final TA value: The BS may determine, as a final TA value, the average value of a TA value $2*\tau_{beam,best}$ for a beam having the best reception quality and a TA value $2*\tau_{beam,2nd}$ for a beam having the second best reception quality. That is, the final TA value may be determined by Equation 4.

$$\text{Total } TA = \frac{2 \times \tau_{beam,best} + 2 \times \tau_{beam,2nd}}{2} \quad \text{[Equation 4]}$$

Figure 13:
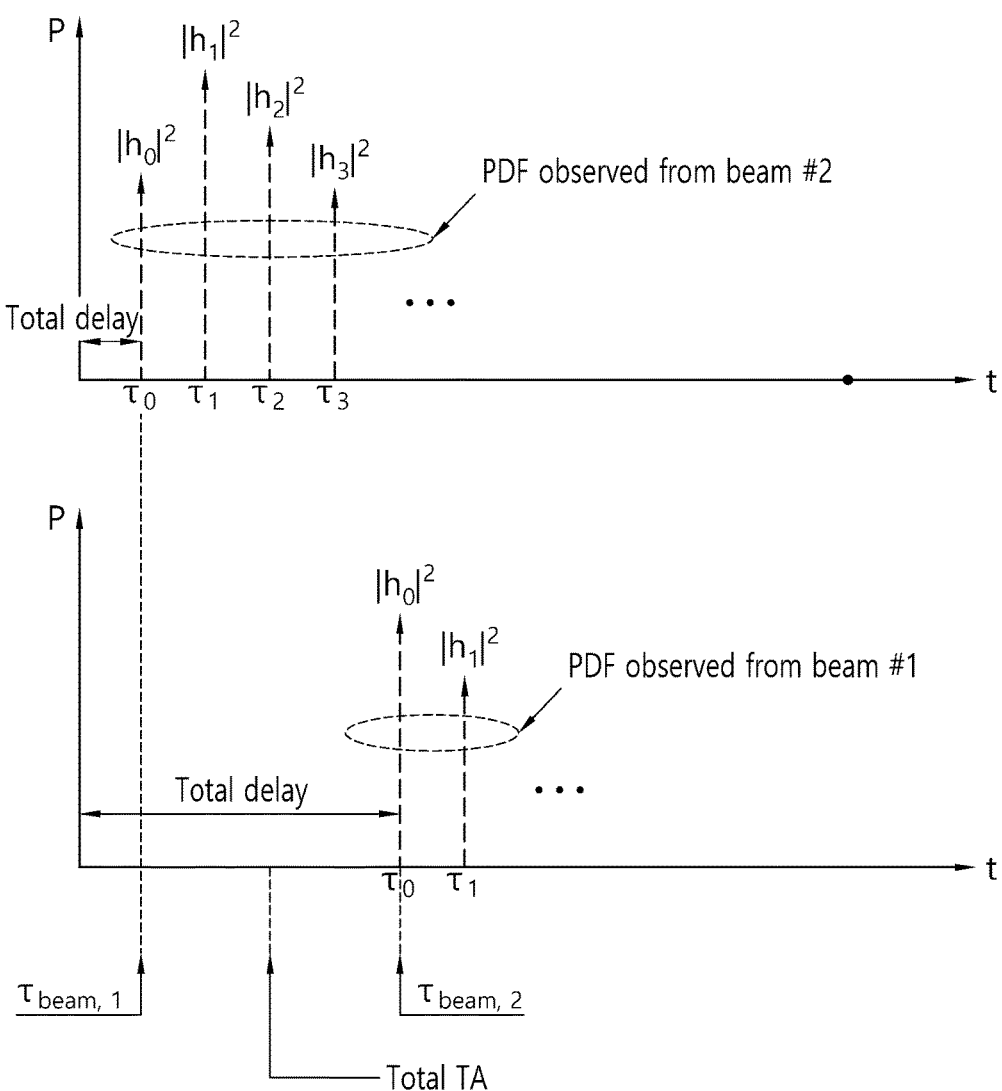
FIG. 13 shows an example of determining a final TA value based on a TA value estimated for each beam according to an embodiment of the present invention.

FIG. 13 shows an example of determining a final TA value based on a TA value estimated for each beam according to an embodiment of the present invention. In FIG. 13, assuming that beams #1 and #2 are respectively selected as a beam with the best reception quality and a beam with the second best reception quality among K different beams, the average value of a TA value for beam #1 and a TA value for beam #2 is determined as a final TA value.

(4) Determine the average value of the TA values of all beams having a reception strength of a specified threshold or higher as a final TA value: The BS may selects all beams having a reception strength of a specified reference power $P_{threshold}$ or higher and may determine the average value of the TA values of the beams as a final TA value. That is, the final TA value may be determined by Equation 5.

$$\frac{2 \times \tau_{beam,1} + 2 \times \tau_{beam,2} + \ldots + 2 \times \tau_{beam,K}}{K_s} \qquad \text{[Equation 5]}$$

(here, $P_{beam\ \#1}, P_{beam\ \#2}, \ldots, P_{beam\ \#K} > P_{threshold}$)

In Equation 5, KS represents the total number of selected beams. In addition, an average TA may be derived by applying a weight according to received signal power.

Figure 14:
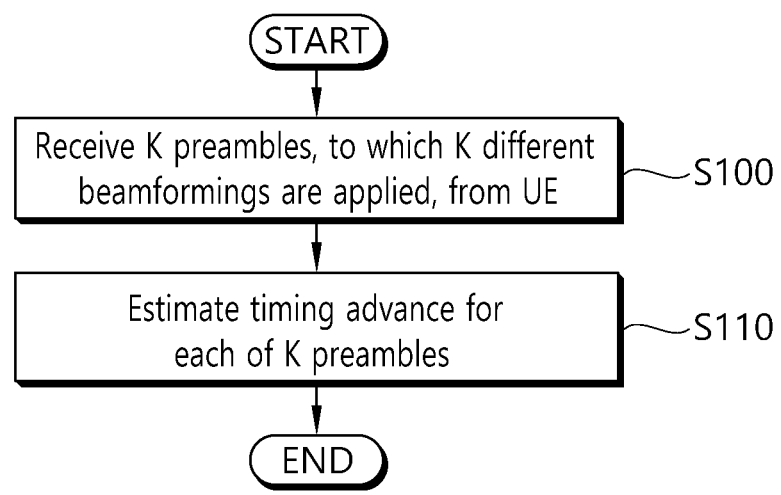
FIG. 14 shows a method for a BS to estimate a TA for each beam according to an embodiment of the present invention.

FIG. 14 shows a method for a BS to estimate a TA for each beam according to an embodiment of the present invention.

In step S100, the BS receives K preambles, to which K different beamformings are applied, from a UE. The K preambles may be received through different subframes. Alternatively, the K preambles may be successively received in the same subframe. The beamformings may include at least one of analog beamforming, digital beamforming, and hybrid beamforming.

In step S110, the BS estimates a TA for each of the K preambles. Estimating a TA for each of the K preambles may include estimating a channel delay for each of the K preambles, in which Equation 1 may be used to estimate a channel delay for each preamble.

The BS may determine the final TA value of the UE based on the TA estimated for each of the K preambles. The final TA value of the UE may be determined based on a TA value corresponding to one preamble selected from the K preambles. For example, the final TA value of the UE may be a TA value corresponding to a preamble having the best reception quality among the K preambles. The final TA value of the UE may be the average value of a TA value used for conventional synchronization and a TA value corresponding to a preamble having the best reception quality among the K preambles. In another example, the final TA value of the UE may be determined based on TA values corresponding to two or more preambles among the K preambles. The final TA value of the UE may be the average value of a TA value corresponding to a preamble having the best reception quality among the K preambles and a TA value corresponding to a preamble having the second best reception quality. The final TA value of the UE may be the average value of TA values corresponding to preambles having a reception quality of a specified threshold or higher among the K preambles.

The BS may transmit a TA command including the determined final TA value of the UE to the UE.

Figure 15:
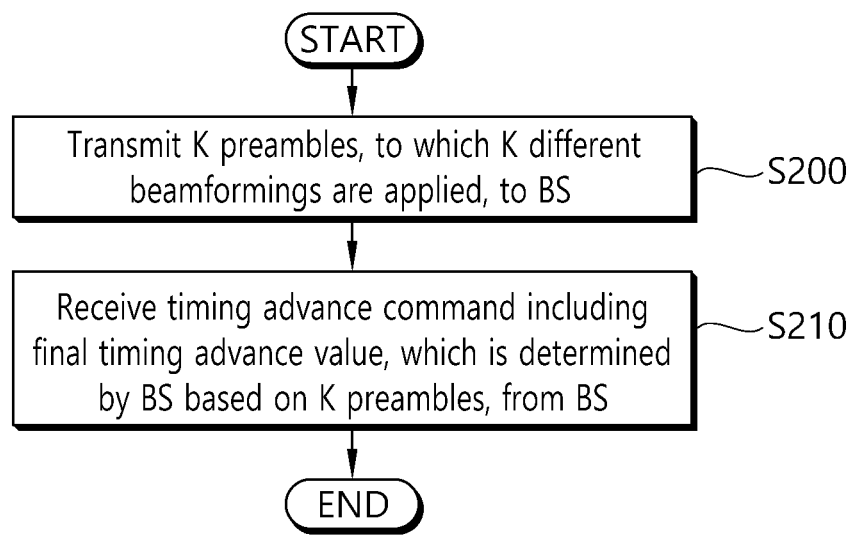
FIG. 15 shows a method for a UE to apply a TA according to an embodiment of the present invention.

FIG. 15 shows a method for a UE to apply a TA according to an embodiment of the present invention.

In step S200, the UE transmits K preambles, to which K different beamformings are applied, to a BS. The K preambles may be transmitted through different subframes. Alternatively, the K preambles may be successively transmitted in the same subframe. The beamformings may include at least one of analog beamforming, digital beamforming, and hybrid beamforming.

In step S210, the UE receives a TA command including a final TA value, which is determined by the BS based on the K preambles, from the BS and applies the TA. The BS may determine the final TA value based on the K preambles using various methods described in the present specification.

Figure 16:
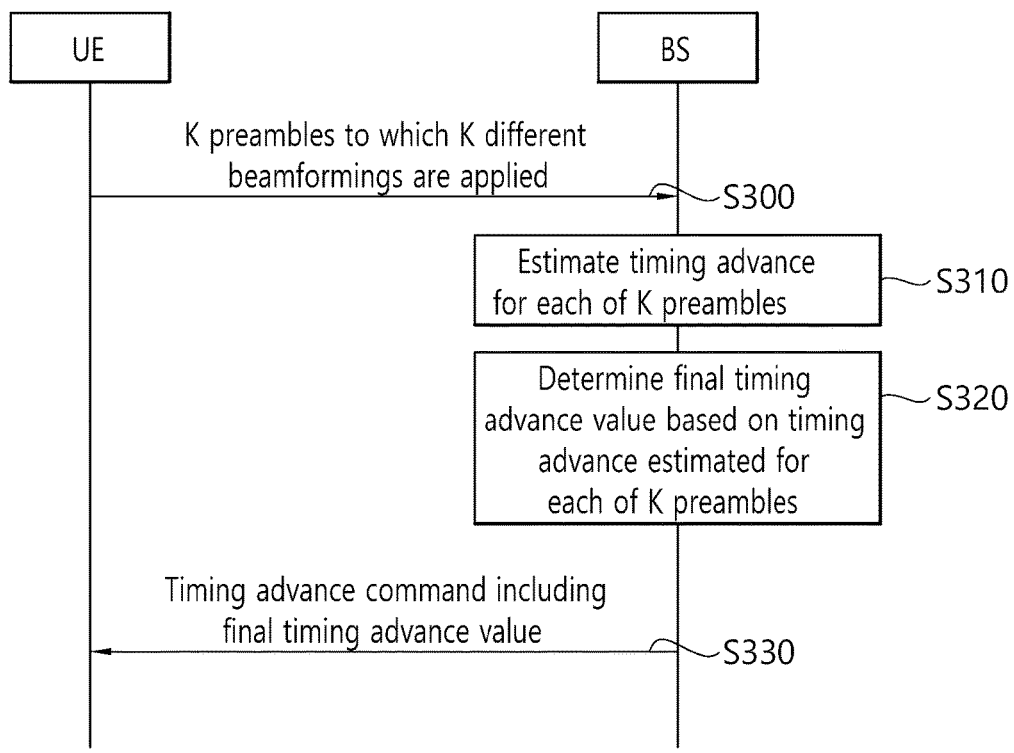
FIG. 16 shows a TA procedure according to an embodiment of the present invention.

FIG. 16 shows a TA procedure according to an embodiment of the present invention.

In step S300, the UE transmits K preambles, to which K different beamformings are applied, to a BS. The K preambles may be transmitted through different subframes. Alternatively, the K preambles may be successively transmitted in the same subframe. The beamformings may include at least one of analog beamforming, digital beamforming, and hybrid beamforming.

In step S310, the BS estimates a TA for each of the K preambles. Estimating a TA for each of the K preambles may include estimating a channel delay for each of the K preambles, in which Equation 1 may be used to estimate a channel delay for each preamble.

In step S320, the BS determines a final TA value based on a TA estimated for each of the K preambles. The BS may determine the final TA value using various methods described in the present specification.

In step S330, the BS transmits a TA command including the final TA value to the UE.

The above description of the present invention shows that a plurality of beams is transmitted from a single antenna array, this is merely an example. The present invention described above may also be applied to the transmission of one beam from each of some antennas arrays. In this case, each beam may be applied as a transmission beam of each sub-array.

Further, the foregoing present invention may be applied to a combination of a transmitter and a receiver. If the transmitter is a BS and the receiver is a UE, the foregoing present invention may be applied to DL. If the transmitter is a UE and the receiver is a BS, the foregoing present invention may be applied to UL. If both the transmitter and the receiver are UEs, the foregoing present invention may be applied to a side link.

The foregoing present invention may be applied to beamforming or precoding through both analog and digital processing with respect to a multi-antenna. When the foregoing present invention is applied to a broadband system, a broadband may be divided into specified frequency domains (for example, sub-bands, subcarriers, resource blocks, or the like), and a separate feedback information set may be transmitted with respect to each frequency domain. Alternatively, feedback information may be transmitted only with respect to a particular frequency domain selected by a UE or designated by a BS. The frequency domain may include one or more successive areas on the frequency axis or may include one or more non-consecutive areas on the frequency axis.

Figure 17:
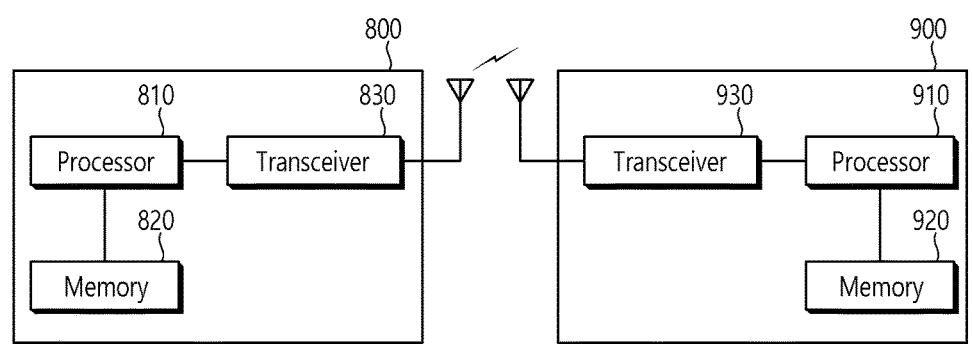
FIG. 17 shows a wireless communication system to implement an embodiment of the present invention.

FIG. 17 shows a wireless communication system to implement an embodiment of the present invention.

A BS 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for estimating, by a base station (BS), a timing advance (TA) for each beam in a wireless communication system, the method comprising:
    receiving K preambles, to which K different beamformings are applied, from a user equipment (UE), where K is a number;
    estimating a channel delay for each of the K preambles based on the following equation:

$$m_K^* = \arg\min_m \left| \sum_{j=0}^{L-1} \sum_{i=0}^{N-1} Y[i+j+m]S^*[i] \right|^2,$$

where i is a time index, m is a timing offset, N is a total length of a time signal (or orthogonal frequency division multiplexing (OFDM) symbol length), L is a multipath channel delay length by probability distribution function (PDF), Y is a signal received at time i, and S is a signal transmitted at time i; and
    estimating the TA for the each of the K preambles based on the estimated channel delay for the each of the K preambles.

2. The method of claim 1, wherein the K preambles are received through different subframes.

3. The method of claim 1, wherein the K preambles are successively received in a same subframe.

4. The method of claim 1, further comprising determining a final TA value of the UE based on the estimated TA for the each of the K preambles.

5. The method of claim 4, wherein the final TA value of the UE is determined to be a TA value related to a preamble having a best reception quality among the K preambles.

6. The method of claim 4, wherein the final TA value of the UE is determined to be an average value of a TA value used for conventional synchronization and a TA value related to a preamble having a best reception quality among the K preambles.

7. The method of claim 4, wherein the final TA value of the UE is determined based on TA values related to two or more preambles among the K preambles.

8. The method of claim 7, wherein the final TA value of the UE is determined to be an average value of a TA value related to a preamble having a best reception quality among the K preambles and a TA value related to a preamble having a second best reception quality.

9. The method of claim 7, wherein the final TA value of the UE is determined to be an average value of TA values related to preambles having a reception quality of a specified threshold or higher among the K preambles.

10. The method of claim 4, further comprising transmitting a TA command comprising the determined final TA value of the UE to the UE.

11. The method of claim 1, wherein the beamformings comprise at least one of analog beamforming, digital beamforming, or hybrid beamforming.

12. A base station (BS) for estimating a timing advance (TA) for each beam, the BS comprising:
    a transceiver; and
    a processor operatively coupled to the transceiver, wherein the processor is configured to:
    control the transceiver to receive K preambles, to which K different beamformings are applied, from a user equipment (UE), where K is a number;
    estimate a channel delay for each of the K preambles based on the following equation:

$$m_K^* = \arg\min_m \left| \sum_{j=0}^{L-1} \sum_{i=0}^{N-1} Y[i+j+m]S^*[i] \right|^2,$$

where i is a time index, m is a timing offset, N is a total length of a time signal (or orthogonal frequency division multiplexing (OFDM) symbol length), L is a multipath channel delay length by probability distribution function (PDF), Y is a signal received at time i, and S is a signal transmitted at time i; and
    estimate the TA for the each of the K preambles based on the estimated channel delay for the each of the K preambles.

13. The BS of claim 12, wherein the processor is further configured to:
    determine a final TA value of the UE based on the estimated TA for the each of the K preambles.

14. The BS of claim 13, wherein the final TA value of the UE is determined to be a TA value related to a preamble having a best reception quality among the K preambles.

15. The BS of claim 13, wherein the final TA value of the UE is determined based on TA values related to two or more preambles among the K preambles.

16. The BS of claim 15, wherein the final TA value of the UE is determined to be an average value of TA values related to preambles having a reception quality of a specified threshold or higher among the K preambles.

17. The BS of claim 13, wherein the processor is further configured to:
    control the transceiver to transmit a TA command comprising the determined final TA value of the UE to the UE.

* * * * *